United States Patent
Noel et al.

[54] THREADED JOINT FOR PIPES

[75] Inventors: Thierry Noel, Sebourg, France; Takuya Tsujimura, Amagasaki, Japan

[73] Assignees: Vallourec Oil & Gas, Aulnoye-Aymeries, France; Sumitomo Metal Industries, Osaka, Japan

[21] Appl. No.: 907,619

[22] Filed: Aug. 8, 1997

Related U.S. Application Data

[63] Continuation of Ser. No. 452,069, May 26, 1995, abandoned.

[30] Foreign Application Priority Data

Oct. 13, 1994 [FR] France ................... 94 12441

[51] Int. Cl.$^6$ ........................................ F16L 25/00
[52] U.S. Cl. .................. 285/332; 285/334; 285/383; 285/390
[58] Field of Search ................... 285/332, 333, 285/334, 355, 332.1, 383, 390

[56] References Cited

U.S. PATENT DOCUMENTS

| | | |
|---|---|---|
| 1,525,414 | 2/1925 | Roeckner ............... 285/383 X |
| 2,992,019 | 7/1961 | Macarthur . |
| 3,574,373 | 4/1971 | Le Derf . |
| 3,870,351 | 3/1975 | Matsuki . |
| 4,373,750 | 2/1983 | Mantelle et al. . |
| 4,494,777 | 1/1985 | Duret . |
| 4,538,840 | 9/1985 | Delange ................... 285/333 |
| 4,570,982 | 2/1986 | Blose et al. ............... 285/334 |
| 4,619,472 | 10/1986 | Kozono et al. ............ 285/333 |
| 4,623,173 | 11/1986 | Handa et al. ............. 285/333 |
| 4,629,222 | 12/1986 | Dearden et al. . |
| 4,629,223 | 12/1986 | Dearden et al. . |
| 4,673,201 | 6/1987 | Dearden et al. . |
| 4,736,967 | 4/1988 | Mott et al. . |
| 4,770,444 | 9/1988 | Hauk ....................... 285/333 |
| 4,958,862 | 9/1990 | Cappelli et al. ........... 285/334 |
| 4,984,829 | 1/1991 | Saigo et al. . |
| 5,029,906 | 7/1991 | Chelette et al. ........... 285/334 |

FOREIGN PATENT DOCUMENTS

| | | |
|---|---|---|
| 0 027 771 | 4/1981 | European Pat. Off. . |
| 157587 | 10/1985 | European Pat. Off. ........ 285/333 |
| 0 488 912 | 6/1992 | European Pat. Off. . |
| 1 488 719 | 6/1967 | France . |
| 182691 | 7/1989 | Japan ....................... 285/333 |
| 2 146 085 | 4/1985 | United Kingdom . |

OTHER PUBLICATIONS

Database WPAT, Derwent Information Ltd., AN 90–117899/16, EP 364 413, Apr. 18, 1990.
Database WPAT, Derwent Information Ltd., AN 92–185777/23, EP-A-488 912, Jun. 3, 1992.
Database WPAT, Derwent Information Ltd., AN 89–180212/25, EP-A-321 381, Jun. 21, 1989.
Database WPAT, Derwent Information Ltd., AN 87–221297/31, EP-A-233 802, Aug. 26, 1987.

Primary Examiner—Terry Lee Melius
Assistant Examiner—Heather Shackelford
Attorney, Agent, or Firm—Oblon, Spivak, McClelland, Maier & Neustadt, P.C.

[57] ABSTRACT

The joint according to the invention relates to a sealed connection between metal pipes used for producing petroleum tubings or casings. This joint comprises a sleeve fitted with two threaded housings suitable for receiving the male ends of two pipes. The end faces thereof come to bear one against the other inside the sleeve. An annular convex tapering zone near the end face of each pipe bears in a sealing manner against an annular concave tapering zone of the sleeve. Shoulder stops 16 ensure the centering of each male end.

24 Claims, 4 Drawing Sheets

THREADED JOINT FOR PIPES

This application is a continuation of application Ser. No. 08/452,069, filed on May 26, 1995, now abandoned.

TITLE OF THE INVENTION

The present threaded joint for pipes according to the invention relates to the pipes used in industry for the production of tubing or casing for the exploration or extraction of deposits of petrol or gas, as well as the pipes used for any application in which the same type of problems may occur such as, for example, geothermal problems or steam.

DISCUSSION OF THE BACKGROUND

Numerous difficulties are met with due to the necessity of ensuring sealing of the connections between the ends of the pipes, the pipes being generally metallic.

The pipe joints most often used have tapering threads which allow stable tightening with excellent mechanical strength, without the risk of unscrewing, to be obtained in a very few turns.

On the other hand, these threads are not capable of ensuring the sealing of the joint as the petrol or the gas under high pressure circulates easily along the threads by virtue of the clearances present. The use of greases loaded with fine solid particles of different types delays these leaks but does not eliminate them.

It is known, on the other hand, to obtain sealing by virtue of annular abutment and bearing surface zones machined onto each joint element which allow sealed metal-metal contact to be made by tightening, accompanied by sufficient elastic deformation. Different types of embodiments of joints with threaded male and female elements are known, which allow particularly high-performance sealed metal-metal connections to be obtained. This is the case with the joint described in patent application EP-0488912 A3. The tapering threaded male element has an abutment zone formed by a tapering concave surface which bears against a tapering convex female surface; a tapering convex supporting surface zone adjacent to the male abutment comes simultaneously to bear against a tapering concave female surface.

According to application EP 488 912, a guiding surface is proposed allowing the avoidance of the frequent risks of damage to the male bearing surface, for example by catching thereof in the female threading when the male element is introduced inside the female element.

While having good sealing, joints made in this manner have the disadvantage of needing significant overmeasures.

Alternative solutions have been proposed which have not been entirely satisfactory.

Patent application EP 0027771 A1 describes a joint for pipes by means of a sleeve, in which the front edges of the two male elements come to abut one against the other inside the sleeve. Moreover, these front edges have been provided with a tapering concave profile which is advantageous for a swelling of the ends of the male elements which thus come to bear against the internal wall of the sleeve, the median zone of which is cylindrical. This patent describes various particular profiles which allow further improvement on the one hand of the sealing of the contact made at the level of the front edges and on the other hand the sealing of the contact between the cylindrical wall of the sleeve and the lateral surfaces with respect to the male elements which are adjacent at the front edges.

This type of joint effectively allows the thickness of the sleeve to be reduced and its internal machining to be simplified. It has at least two big disadvantages, however; firstly the abutment surfaces, which are preferably tapering, deform plastically during tightening of their lateral edges and repeated screwing and unscrewing aggravate these deformations to the point of destroying the sealing of the abutment and also that of the lateral supporting surface on the sleeve; secondly, in the case of a long column of pipes, the axial traction stress due to the weight of the column can become such that the abutment contact is reduced or eliminated and, at the same time this also applies to the lateral supporting surfaces on the sleeve, for which the radial pressure exerted by the end zone of the male element is eliminated when the abutment effect disappears.

Patent application GB 2 146 085 A describes a threaded joint for pipes such as those used for steam, gas or petrol under pressure.

This application repeats the essential features of application EP 27771. As in this application, the front edges of the two male elements come to abut with their external edge, because of their tapering concave shape, in the inside of the sleeve. With sufficient tightening, the V-shaped opening which these edges form in the direction of the interior closes at the same time as there is an expansion and bearing against the internal wall of the sleeve in the median zone thereof.

The abutment zone comprises, as in the case of application EP 27771, a first sealing zone, and the radial contact which results from tightening the abutment with the internal wall of the sleeve constitutes a second sealing zone. Shoulders allow the axial displacement of each of the male elements inside the sleeve to be limited.

The joint according to this GB application presents practically the same advantages and the same disadvantages as the EP application cited earlier.

It is practically impossible to avoid the phenomena of seizing and plastic deformation of the front edges during screwing thereof one against the other, even if the tapering concave edges are replaced with rounded edges. It seems moreover very difficult to obtain a sufficient and reproducible radial displacement to fill the annular void which exists between the wall of the sleeve and the walls with respect to the male elements which are adjacent at the front edges.

In this case too, if the traction exerted by the column of pipes becomes too great, the primary and secondary sealing zones completely lose their sealing capability.

The possibility of retaining the advantages presented by sleeves with reduced thickness, such as those described in the two latter documents cited has been researched. These advantages are in effect a consequence of the elimination of overmeasure heels, into which the abutments and the bearing surfaces described in the documents such as application EP 488 912 cited above are machined.

Principally, the possibility of producing economical joints comprising double sealing, on the one hand by abutment and on the other hand by supporting surface has been researched, these being joints in which loosening of the abutment caused by example by a particularly large weight of the column of pipes, would have no direct impact on the level of sealing of the supporting surface.

The avoidance of the risks of rapid deterioration of the quality of the metal-metal contact made between the front edges of the male elements of the joint as a result of repeated cycles of unscrewing and screwing up again of these male elements has also been sought.

The establishment of a second sealing zone has also been sought, with a limited axial length to facilitate machining, which zone does not need a substantial increase in the thickness of the sleeve, as the degree of sealing obtained in this second zone does not vary in a noticeable manner during possible loosening of the abutment contact between the front edges of the male elements.

It has also been sought to resolve in a reliable and reproducible manner the problem of production of a precise and reproducible axial setting of the two male elements in abutment one against the other inside the sleeve while avoiding the risk of tightening by insufficient or excessive screwing of one of the male elements with respect to the other.

SUMMARY OF THE INVENTION

The threaded joint for pipes according to the present invention comprises a sleeve, the two ends of which are provided with threaded female housings suitable for receiving the threaded male end elements of the two pipes which have to be joined. The ends of each of these male elements comprise an end face, the interior edge of which possibly comprises a rounding or an obtuse angle. The axial length of the end zone without threading of each male element is determined so that when these elements are screwed completely into their respective female housings, their end faces come to abut one against the other. The tight contact between these two abutment surfaces advantageously constitutes a sealing metal-metal contact. The establishment of this contact is preceded by another sealing metal-metal contact produced between an annular zone of the peripheral wall of the end zone of each male element, preferably adjacent to the end face, and a corresponding annular zone of the internal wall of the sleeve. These two annular zones have tapering surfaces, the generating lines of which are inclined with respect to the axis of the sleeve. The generating lines of these tapering surfaces advantageously form an angle of 5° to 25° with the axis, and are advantageously parallel to one another in their median zone, but these surfaces may comprise at their ends curves connecting with the adjacent walls. These tapering surfaces are oriented in a manner such that their diameters decrease as they get closer to the centre of the sleeve. They are located and dimensioned in a manner such that the tapering surface of each male element comes into contact during screwing with the corresponding female surface of the sleeve and that the interference between these two surfaces creates a tapering bearing surface which is a metal-metal sealing surface. Said bearing surfaces may be referred to in the whole specification or in the claims as supporting surfaces or sealing surfaces.

The length of the generating line of these tapering sealing supporting surfaces is advantageously between approximately 0.5 and 5 mm. The sealing characteristics of these tapering supporting surfaces depends upon the level of stress reached , the state of the surface and the characteristics of the coatings and/or lubricants used. These coatings and/or lubricants play a particularly important role when the joints produced are intended to be subjected to numerous cycles of screwing and unscrewing during their use.

The use of tapering supporting surfaces comprising very short generating lines is facilitated by precise axial positioning of each male element inside the sleeve so that the plane of abutment of the ends of the two pipes is strictly and reproducibly positioned during screwing up of the joint in the place where the geometry of the joint gives the maximum effectiveness, that is to say within a tolerance zone well defined with respect to the median plane of the sleeve.

In order to achieve this end, a system of shoulder stops is used on the sleeve and on the pipes, placed on the sleeve preferably in the vicinity of the female sealing surfaces. The shoulders located on the sleeve are preferably two in number, positioned at an equal distance from the median plane of the sleeve. The threaded joint may however comprise only one shoulder situated on one side only of the sleeve corresponding to the engagement and to the positioning by screwing of a single male element. Each of these shoulders is provided with an annular stopping surface, oriented in a manner such that it opposes the moving forward of the corresponding male element. Each male component itself has a shoulder provided with an annular stopping surface corresponding to the annular stopping surface of the sleeve in a manner such that its progress is blocked by the corresponding shoulder of the sleeve. When there are two shoulder stops on the sleeve, the axial distance apart of the annular stopping surfaces of the male elements, when these elements are in the abutment position, is determined taking into account machining tolerances so that it is slightly greater than the gap between the annular surfaces of the shoulders fixed to the sleeve so that there is, under normal functioning conditions, a certain clearance when the end faces of the male elements are abutted one against the other.

Thus these shoulders cannot prevent the abutment of the two male elements.

An embodiment of the joint according to the invention consists of screwing the first male element until there is interference between the two tapering sealing surfaces, then blocking the advancement by means of the first pair of shoulders concerned. At this moment the end face of this first element slightly projects over the median plane of the sleeve. The second male element is then screwed until there is interference between the two tapering sealing surfaces, then abutment of the two end faces of the two pipes. If continued, there is a slight elastic drawing back of the first male element without any disadvantage from the point of view of sealing of the tapering surfaces, then possibly there is blocking by the second pair of shoulders. This method of operation guarantees screwing-down under optimum conditions with a certain degree of sealing at the level of the end faces abutted against the two pipes and above all, excellent sealing at the level of the tapering sealing surfaces. In order to obtain the best results without risk of excessive tightening of the abutments, it is sufficient to very carefully control the clearance necessary for the shoulders, the aim of which is not to create additional sealing, but to allow precise centering of the joint. In general the geometry of the joint is calculated in such a manner that, taking into account the manufacturing tolerances, there is no blocking of the second male element on the second pair of shoulders when the joint is assembled under normal conditions. Under these conditions, only the annular stopping surfaces are used which are located on one side of the sleeve. Thus for practical purposes sleeves can be used which have one annular shoulder stop on only one side. Although in this case only the male element end being screwed into the female housing of the sleeve provided with a shoulder stop has to be provided with a corresponding shoulder stop, advantageously a sleeve geometry on the side not provided with a shoulder stop can be arranged which allows screwing regardless of the ends of the male elements being provided with shoulder stops or not. A shoulder stop can then be provided on all the ends of male pipes, although the sleeve is fitted on one side only with a shoulder stop. In a preferred manner, when the sleeve only has a shoulder on one side, the threaded joint is produced by screwing and positioning a corresponding male pipe end onto the sleeve on the side provided with a shoulder, in the factory or workshop, the other male end of the pipe being screwed or positioned in order to complete the assembly on site, where the pipes are used. However, for practical reasons the preferred solution consists of working with a sleeve comprising two symmetrical shoulder stops, the sleeve being able to be used equally well from one side or the other, the axial distance apart between the shoulders being calculated as explained above.

The end face located at the extremity of each of the male elements can be flat or not. Where it is flat, this face is perpendicular to the axis of the pipe. It can also, for example, be slightly conical by a few degrees or fractions of a degree with respect to the plane perpendicular to the axis, or otherwise have a different shape. Advantageously, the common abutment surface of the two end faces of the male elements in the screwed position is flat and perpendicular to the axis of the sleeve. Such a flat common abutment surface perpendicular to the axis can be obtained by flat end faces perpendicular to the axis on each male element end, or otherwise by elastic deformation of conical end faces having a small angle of inclination with respect to a perpendicular plane of the axis which, under the effect of the contact pressure combined with the deformation of the extremity of the male element, will produce a a common abutment surface; in the screwed position, which is flat and perpendicular to the axis of the sleeve.

The threads may be either tapering and in such a case they form in the joined position a positive or negative or zero interference or they may be cylindrical. In the case of tapering threads, threads with a positive interference will be advantageously produced, those threads ensuring when in the screwed position a radial connection between the male thread and the female thread.

With regard to the shoulder stops, will be seen from the examples, several locations are possible. Although positions closest together are preferred, the shoulders may conceivably be distanced apart by placing them, for example, half way along the male and female threads, which could be for example cylindrical, and of different diameters, separated by an annular surface forming the shoulder stop.

One particularly advantageous embodiment for producing the threaded joint according to the invention allows the sealing of the metal-metal contact produced between the convex tapering surfaces of the male elements and the corresponding concave tapering surfaces of the sleeve of the assembly to be retained in spite of extreme working conditions and the execution of numerous unscrewing and re-screwing cycles in service.

According to this particular embodiment, each convex tapering surface is connected by its large diameter end to a preferably cylindrical surface which ensures connection with a male shoulder stop by means of a toric annular connecting surface.

In this case, the generating line of the convex tapering surface is advantageously between approximately 1 and 5 mm, preferably between 2±1 mm in length and has an inclination of between 5° and 25° with respect to the axis. The generating line of the toric connecting surface has a radius of between 1 and 25.4 mm, preferably of 4 to 8 mm. The arc angle of this generating line, the convex tapering surface. This convex tapering surface is connected at its small diameter extremity to the end face of the male element, preferably by a toric surface, the generating line of which has a radius generally of smaller dimensions than hereinabove.

As the concave tapering surface of the sleeve has to cooperate with the convex tapering surface of the male element, it has the same degree of inclination of the generating line, but a slightly greater length. Its upward extremity with a diameter greater than the corresponding extremity of the convex tapering surface, is connected by a surface, preferably cylindrical, to the female shoulder stop.

It has been noted that by appropriately selecting the dimensions and the inclination of the concave and convex tapering surfaces as well as the principal radius of connection of the convex tapering surface to the upward facing cylindrical surface and also the secondary radius of connection of this convex tapering surface to the end wall, a better distribution of the stresses between the surfaces pressing one against the other during tightening by screwing each male element into its housing is obtained.

It has been noted in particular that after screwing the convex and concave tapering surfaces, the maximum tightening stress is exerted between the large diameter end zone of the convex tapering surface and the concave tapering surface against which this relatively narrow convex surface comes to bear. The displacement during screwing of the extremity of the male element according to the common axis thereof and of the sleeve makes this zone of increased pressure slip along the concave tapering surface and spreads the wear and tear over a part of a surface of the sleeve which is coated with a protective layer.

This spread of wear and tear of the protective layer over a relatively wide zone allows its life to be prolonged in a very significant manner and thus to delay the risks of metal stripping. On the contrary, localized wear and tear of the convex tapering surface which is not protected does not carry the same risks. As has been described above, the geometry of the zone of the extremity of the male element and of the sleeve is adjusted such that when the end face of the male element reaches the median plane of the sleeve, located between two female housings, the tightening produced between the two tapering surfaces ensures excellent metal-metal sealing. This sealing is maintained by producing a frontal tightening of the two male elements one against the other adjacent to this median plane. As indicated above, the position of the pairs of male-female shoulder stops on each side of the sleeve is determined such that the corresponding stopping surfaces cannot come into contact on each side of the sleeve. In practice, the total clearance between these pairs of stopping surfaces is adjusted so that it is of the order of 0.1 to 0.5 mm. The sleeve may comprise only a single shoulder stop. In this case the upward extremity, that is the threaded side of the concave tapering surface is connected by a surface with a shape adapted to the female thread. Preferably, an annular space which allows introduction or removal of the machine tool during machining of the female thread is provided in the space produced between the shoulder stops and the start of the female thread.

BRIEF DESCRIPTION OF THE DRAWINGS

The schematic drawings and the examples given below describe in a non-limiting way the characteristics of the threaded joint for metal pipes according to the invention, as well as particular types of embodiments and use for this joint.

DESCRIPTION OF THE PREFERRED EMBODIMENTS

Figure 1:
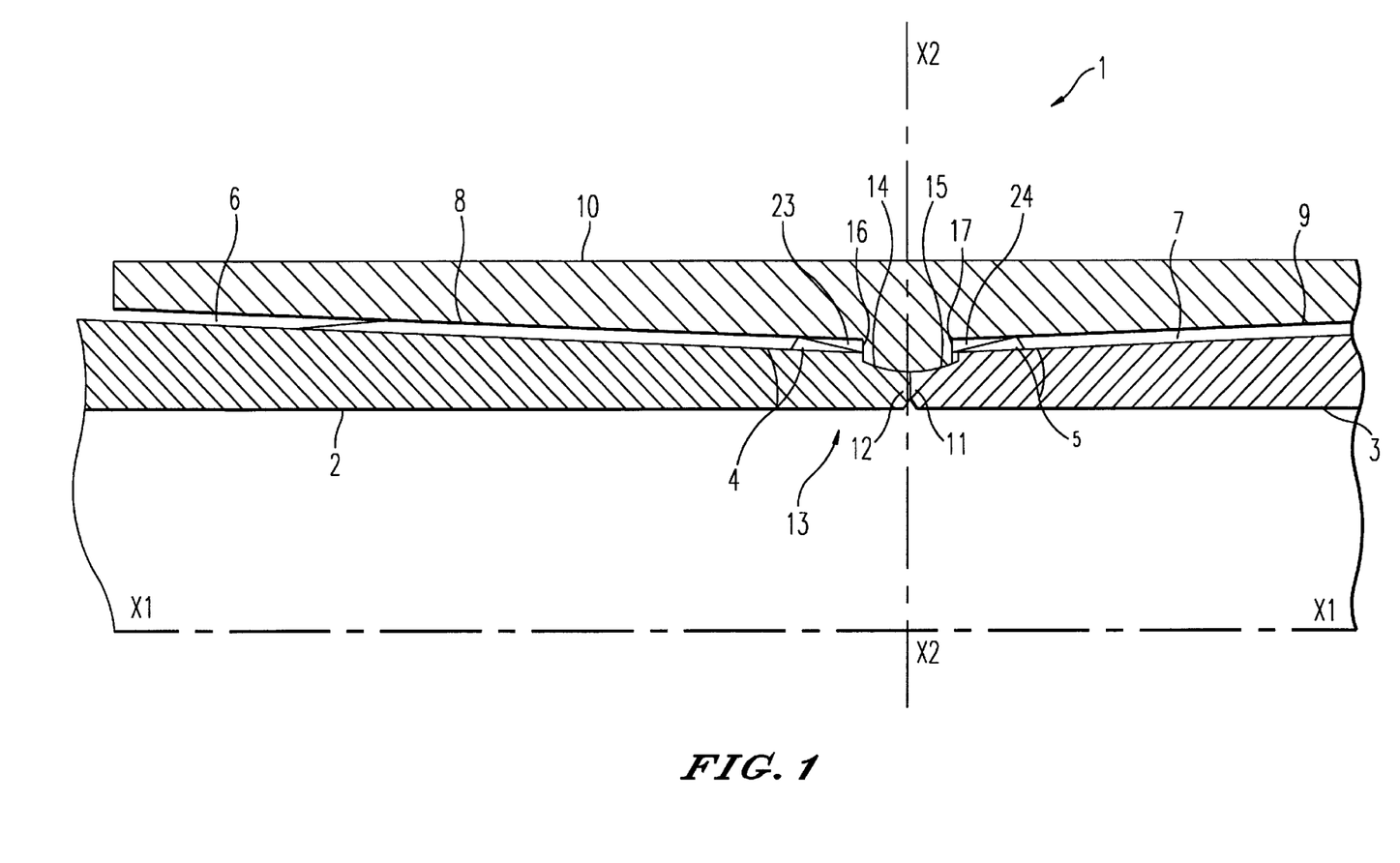
FIG. 1 A schematic overall view in section of a joint according to the invention. Only the section above the axis is shown.

FIG. 1 shows schematically and in section a threaded joint 1 according to the invention. The axis X1—X1 located in the plane of the drawing is that of the joint, only the top half being shown.

This joint comprises the male elements 2, 3 which constitute the ends of two metallic pipes which are not shown. These male elements 2, 3 comprise tapering threads 4, 5 engaged in corresponding threads 6, 7 of the female housings 8, 9 of a sleeve 10. These threads preferably have a slope of approximately 2.5 to 10% with respect to X1—X1 and are preferably of a type known as having positive interference, ensuring a radial connection without clearance between the male elements and the female housings in the tightened, screwed-down position.

The annular end faces 11, 12 of each male element 2, 3 have a flat annular surface perpendicular to the axis of each male element, which axis merges with X1—X1 after screwing-down.

Figure 2:
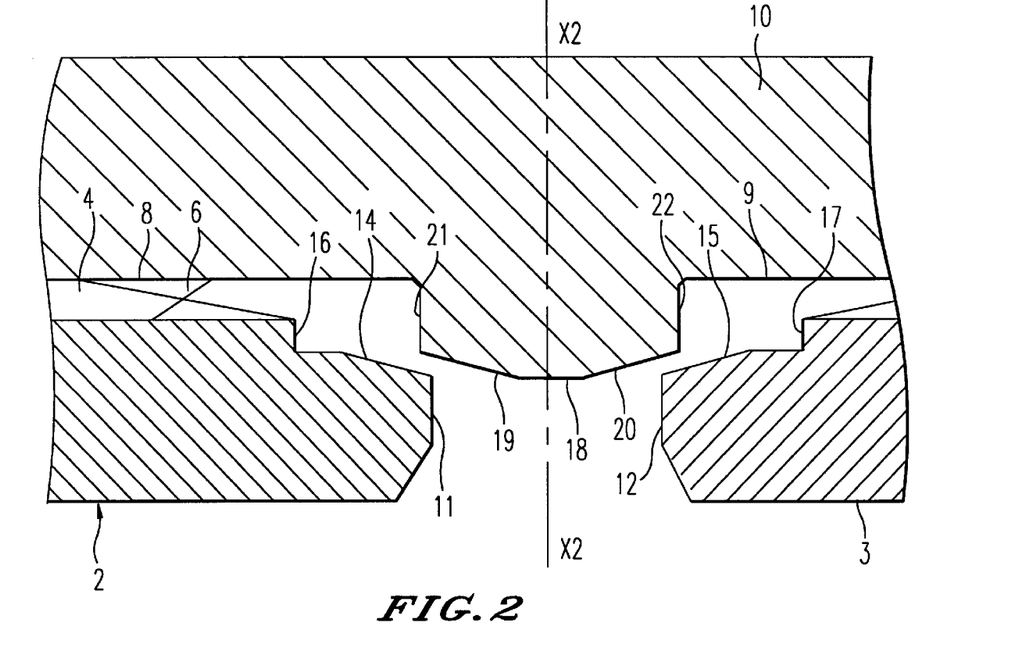
FIG. 2 A schematic view of the median zone of the joint shown in FIG. 1 before tightening.
Figure 3:
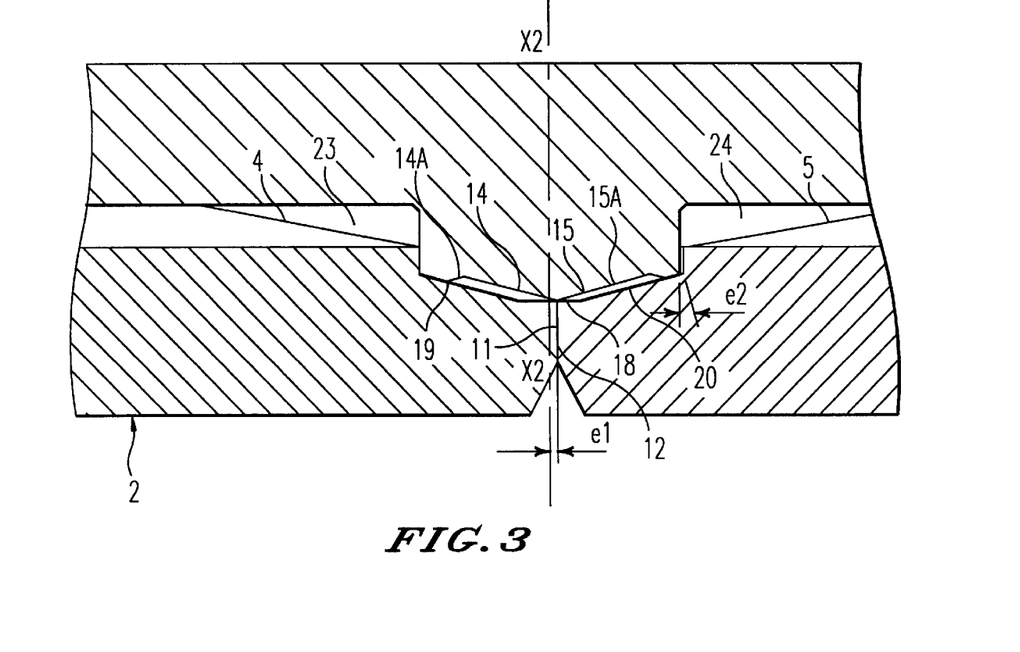
FIG. 3 A schematic view of the median zone shown in FIG. 2, after tightening.

FIGS. 2 and 3 represent in a schematic and enlarged manner, the median zone 13 of the joint 1 seen in section. In the case of FIG. 2, the male elements 2, 3 have not yet reached the bottom of the housings 8, 9. Each of these male elements has a peripheral surface 14, 15 of a general tapering shape, which joins up at the end face 11, 12. This surface 14, 15 is tapering convex, its axis is that of the corresponding male element which merges with X1—X1 and has a half angle at its peak which is between approximately 5° and 25°. The length of the generating line of this surface is a function of this angle and also of the diameter of the joint. It can be seen that each of these tapering surfaces 14, 15 joins up with the corresponding end face 11, 12 at its small base. The large base of each of these tapering surfaces joins up with a shoulder stop 16, 17 constituted by a flat annular surface perpendicular to X1—X1, which surface joins up along its periphery with the small diameter end of the male thread 4, 5. Preferably, the distance between this shoulder stop 16, 17 and the tapering convex surface 14, 15 is slight. As also shown in FIG. 2, the sleeve 10 comprises a plane of symmetry perpendicular to X1—X1 which bisects FIG. 2 according to X2—X2. It can be seen that the internal wall of the sleeve comprises, in the case of the present example, a narrow annular zone 18 which is cylindrical and bisected by the axis X2—X2. A cylindrical zone 18 such as this cannot exist in other types of embodiments. On either side of the cylindrical zone 18 the surfaces 19, 20 join up, which generally have a tapering concave shape with an axis X1—X1, their small base being opposite, and disposed symmetrically with respect to the plane of the line X2—X2. The generating lines of the surfaces 19, 20 are inclined with respect to X1—X1 by between approximately 5 and 25°, which inclination is equal or substantially equal to that of the tapering convex surfaces 14, 15. The diameters of the small and large bases of the tapering surfaces 14, 15 on the one hand and 19, 20 on the other hand are determined so that after tightening of the male elements 2, 3 by screwing-down completely in their female housings 8, 9, the end faces 11, 12 being in abutment adjacent to the plane of the line X2—X2, the major part of each of these tapering surfaces come to bear against the opposite surface.

FIG. 3 shows, in an approximative manner, the interference phenomenon which occurs when the male elements 2, 3 are screwed-down until abutment under pressure of the end faces 11, 12 in a plane adjacent to the plane of the line X2—X2. The dashed line of the lines 14A and 15A shows the position which the generating lines 14 and 15 of the tapering convex surfaces would reach if they did notenter into contact with the tapering concave surfaces 19 and 20.

As is known, the phenomenon of seizing is avoided at the level of the sealing surfaces and also if necessary at the level of the threads by making use of chemical processing, such as phosphate treatment with Zn or Mn, or by depositing of metal layers such as Cu, Ni or other surface processing. Different types of lubricants, such as certain greases or numerous types of oil can also be used alone or together with these various deposits.

In the case of FIGS. 1 to 3, the existence of free annular spaces 23, 24 will be noted, which are provided in the interior of the sleeve between the shoulder stops 21, 22 and the end of the corresponding female thread 6, 7. These spaces are provided to serve, if necessary, to receive excess grease and to avoid an increase in pressure, and thereby contribute to the lubrication of the joint, in good conditions, during successive cycles of screwing and unscrewing. These spaces are also used for the removing of machining tools during manufacture.

The particular disposition of the pairs of shoulder stops 16–21 and 17–22 allows the production of a particularly efficient type of joining. It consists of initially screwing on a first male element 2 into its corresponding female housing 8, until, as it were, a sudden discontinuous increase in the tightening torque is detected together with blocking of the advancement due to coming into contact of the two corresponding shoulder stops 16–21.

Generally, the end face 11 then passes slightly beyond the plane of the line X2—X2 during the progression of the first male element 2 into the sleeve. Then the screwing-down of the second male element into its housing takes place, during the course of which tightening a first increase in the torque value may be observed due to the interference of the threads 5–7 and of the conical bearing surfaces 15–20 and then due to the end faces 11, 12 abutting. The second male element pushes back the end face 11 of the first male element a little, the two ends 11–12 being located, in the screwed-down position, on a plane which generally forms a slight clearance "$e_1$" with the lane of the line X2—X2. Taking into account the tolerances and the screwing torques, the case can arise, where the two extremities 11–12 are screwed down in a position in a plane substantially merged with the plane of the line X2—X2. In the screwed-down position of the joint, a slight clearance "$e_2$" can be seen between the male 17 and female 22 shoulder surfaces of the second male element, which slight clearance is visible in FIG. 3, the male 16 and female 21 shoulder surfaces of the first male element being in contact.

By using this type of joint it is practically certain that the two metal-metal connections will be produced, the first at the level of the end faces 11–12 and the second at that of the tapering supporting surfaces 14–19, 15–20, with a degree of sealing which has maximum reliability. It has been noted that after this second screwing-down , there is a slight unscrewing of the first pair of shoulders, the surfaces of the first pair of shoulders 16–21 remaining generally in contact as explained hereinabove.

Figure 4:
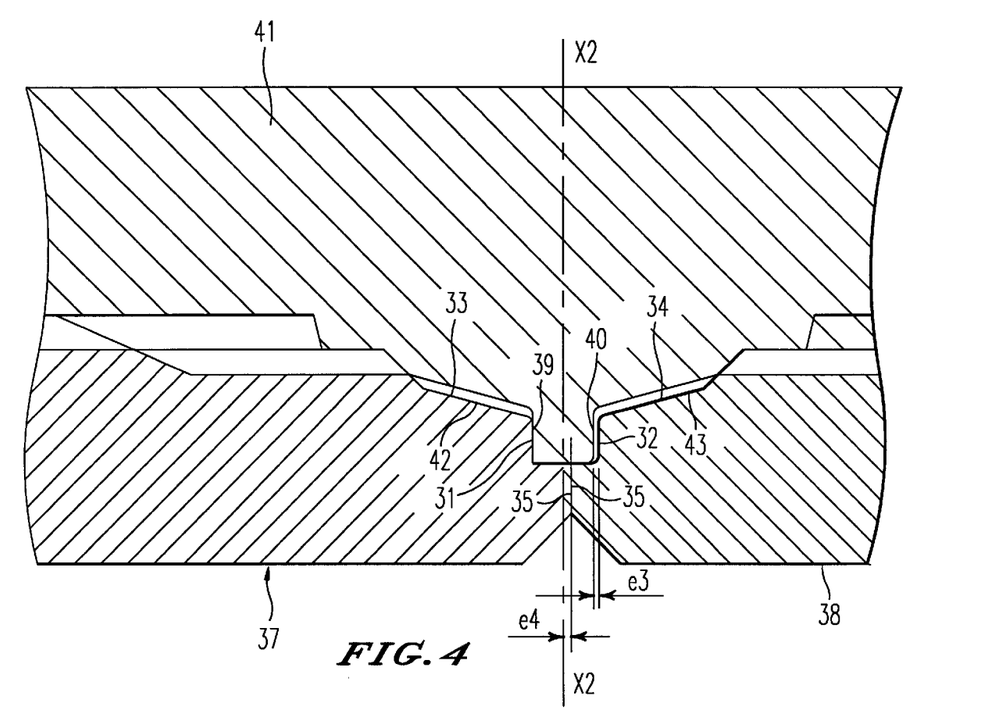
FIG. 4 A schematic view of a joint according to the invention comprising shoulders brought together.

FIG. 4 represents a variation for carrying out the joining described in FIGS. 1 to 3. As this schematic FIG. 4 shows, this variation consists of bringing the shoulder stops together to the maximum extent.

It can be seen that the two male shoulder stops 31, 32 are included between the small bases of the tapering convex sealing surfaces 33, 34 and the end faces 35, 36 of the male elements 37, 38. It will be noted that the distance between the shoulder stops 39, 40 of the sleeve 41 is equal to or slightly greater than the length of the cylindrical zone 18 shown in FIGS. 2 and 3. As a result, the tapering concave sealing surfaces 42, 43 have a position which is practically unchanged and the conditions of use of the joint are not changed. Here again, when screwed-down, there is a slight clearance "$e_3$" between the shoulders 32–40, which clearance is visible in FIG. 4, the plane of abutment when the end faces are screwed down forming a slight clearance "$e_4$" with respect to the plane of symmetry X2—X2.

Figure 5:
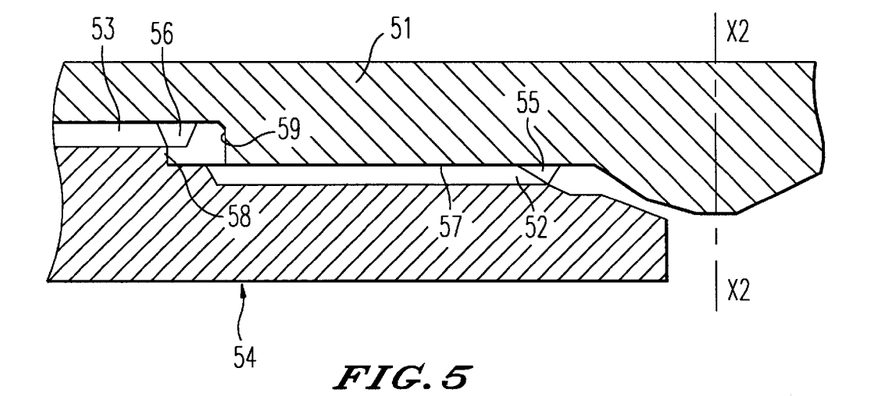
FIG. 5 A schematic view of a joint according to the invention comprising shoulders placed between thread sections with different diameters.

FIG. 5 shows another variation for performance, according to which two levels of cylindrical threads are used instead of tapering threads. As shown in FIG. 5, which schematically shows a sleeve 51 which is partially cut away, the shoulder stops are located at the level of each male element such as 54 and female housing such as 57 in the zone which ensures connection between the two levels of male and female threads. The male and female threads are each on two levels 52, 53 for the male element 54, and 55, 56 for the female housing 57.

The variation in diameter of the two portions of thread for each male element such as 54 causes the appearance of an annular surface which constitutes a male shoulder stop such as 58 and a female shoulder stop such as 59. The other characteristics of the joint are unchanged.

The threads used for carrying out the invention can be of any type, such as conical or cylindrical and of any shape such as, for example, buttress threads with load flanks which have positive or negative angles or otherwise. They can one or two levels, and the shoulders can, in this case, be disposed at places other than those shown in FIG. 5.

Figure 6:
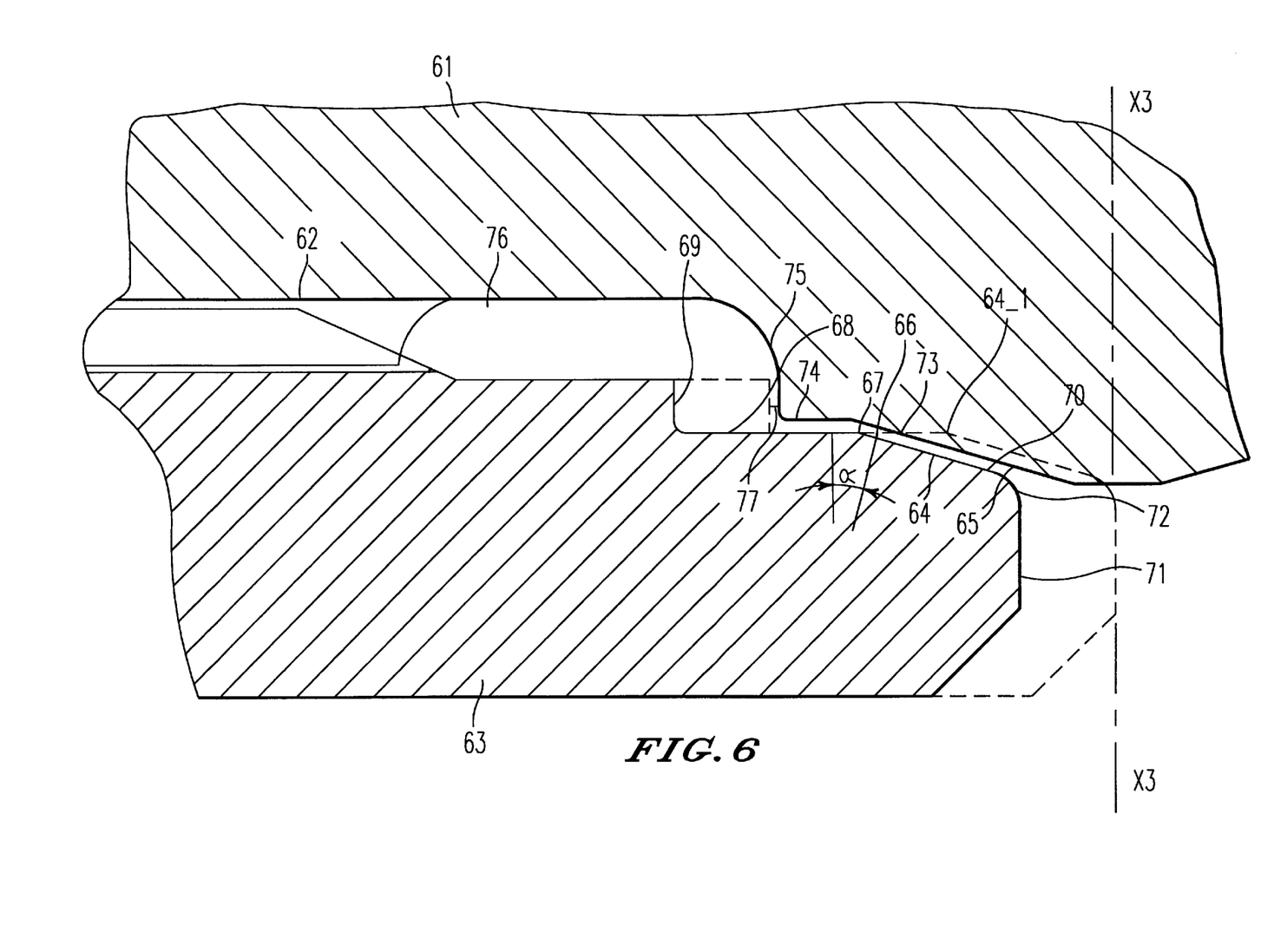
FIG. 6 A schematic view of a joint according to the invention, comprising tapering sealing surfaces, in which the convex tapering surface is upwardly extended by a toric surface.

FIG. 6 shows in a schematic manner an assembly of pipes according to the invention which is produced in a manner such as to further increase resistance to wear and tear of the metal-metal sealing surfaces, with a view to further improving their performance during very many cycles of unscrewing and re-screwing in service.

FIG. 6 shows in section, in a schematic manner, and greatly enlarged, a joint sleeve 61 comprising two female housings such as 62 disposed on either side of a plane of symmetry X3—X3 perpendicular to the longitudinal axis of the sleeve 61. Only the part of the section located above the axis is shown, and only one of the two female housings, situated to the left of the plane of symmetry X3–X3 is indicated.

After machining, this sleeve has undergone a surface treatment to improve its resistance to wear and tear and to corrosion, such as a phosphate treatment. FIG. 6 shows the zone of extremity of the male element 63 after partial screwing down into the threaded housing 62, just before the convex and concave tapering sealing surfaces 64–65 come into contact.

The convex tapering sealing surface 64 has a generating line inclined by approximately 13° with respect to the longitudinal axis of the male element which merges with that of the sleeve. This generating line is approximately 2 mm long. It is extended, from its large diameter extremity 66, by a toric connecting surface, the generating line 67 of which is an arc of a circle α, with an opening angle of approximately 13° and radius of approximately 4 mm, this toric surface being tangential to the tapering surface 64. A cylindrical surface, not necessarily tangential to the toric surface, with a generating line 68, ensures the connection between this toric surface 67 and the male shoulder stop 69. Downwardly, the small diameter extremity 70 of the convex tapering surface joins with the annular end face 71, perpendicular to the longitudinal axis of the male element, by means of a rounding off 72 substantially tapering in shape and with a small radius. The concave tapering surface 65 is preferably longer than the convex tapering surface 64 and its upward extremity 73 has a larger diameter than the upward larger diameter extremity 66 of the corresponding convex tapering surface. This extremity joins, by means of a cylindrical surface 74, to the female shoulder stop 75. Above this shoulder stop, and before the beginning of the female threaded zone, an annular, non-threaded zone 76 is preferably arranged, which, during machining allows either the introduction of removal of a machining tool, for example with two teeth. Equally preferably, the length of this annular zone is a minimum of 1.5 times the thread pitch.

The contour shown by dashed lines represents the position of the male element in the inside of the female housing just before the shoulders 69–75 make contact. The annular end face 71 is then in the median plane X3—X3. It can also be seen that the establishment of a metal-metal sealing contact between the two tapering surfaces 64, 65 precedes the arrival of the end face 71 in the median plane X3—X3. It can also be seen that the meeting of the two tapering surface 64, 65 is accompanied by a slipping of the convex surface 64 on the concave surface 65 in the downward direction with, at the same time, recoiling of the concave surface 65 and compression of the convex surface 64 by interference, as shown by the dashed line 64.1 which tries to give an idea of the position reached by the tapering surfaces 64, 65 in contact when the end face has reached the plane X3—X3.

As described in the general description, calculations and experience have shown that the maximum pressure exerted between the two tapering surfaces 64, 65 is situated well within the large diameter zone 66 of the convex tapering surface, adjacent to the toric surface 67. The slipping of this zone on the concave tapering surface 65 limits wear and tear thereof by virtue of the spreading of this wear and tear and of the protective layer.

Thus excellent sealing is obtained at the level of the tapering surfaces, which sealing is particularly well resistant to a large number of screwing up and unscrewing operations.

The invention can be embodied in a very great number of variations, which all remain within the scope covered by the patent.

We claim:

1. A threaded joint for metal pipes comprising:
   a sleeve having first and second end portions, each of said first and second end portions of said sleeve defining first and second threaded female housings; and
   first and second male elements which can be respectively screwed into said first and second threaded female housings, each of said first and second male elements comprising an end with a male non-threaded abutment zone which includes an end face, the end faces of each of said first and second male elements abutting against one another when the first and second male elements are screwed respectively into said first and second threaded female housings to a screwed-down position, so as to produce a first metal-to-metal bearing contact surface between the end faces of said first and second male elements;

wherein:

said male non-threaded abutment zone of each of said first and second male elements further comprises a male non-threaded peripheral zone, said male non-threaded peripheral zone comprising a convex tapering surface in which a generating straight line which extends from the convex tapering surfaces intersects with an axis of the corresponding first and second male elements;

each of said first and second threaded female housings has a female non-threaded abutment zone which comprises a concave tapering surface which corresponds with the convex tapering surface of each of said first and second male elements, such that in said screwed-down position the convex tapering surfaces of each of said first and second male elements come into contact with the concave tapering surfaces of each of said first and second threaded female housings with a positive interference to create a sealing second metal-to-metal bearing contact surface; and at least one of said first and second male elements further comprises a first male shoulder stop which corresponds to a first female shoulder stop on at least one of said first and second threaded female housings, the first male shoulder stop and the first female shoulder stop being disposed such that in the screwed-down position the contacting end faces of each of the first and second male elements are positioned in a plane which is slightly spaced from the median plane of symmetry of the sleeve.

2. A threaded joint according to claim 1, wherein the end face of each of said first and second male elements is flat and located in a plane perpendicular to the axis of the first and second male elements.

3. A threaded joint according to claim 1 or 2, wherein the other of said first and second male elements comprises a second male shoulder stop which corresponds to a second female shoulder stop on the other of the first and second threaded female housings, the first and second female shoulder stops of each of said first and second threaded female housings are positioned on an interior of each of said threaded female housings in the form of an annular stopping surface oriented in such a manner that it opposes a forward movement of a corresponding one of the first and second male elements, the first and second male shoulder stops of each of the first and second male elements defining a corresponding annular surface suitable for cooperating with the annular stopping surface of each of the first and second threaded female housings.

4. A threaded joint according to claim 1 or 2, wherein the first female shoulder stop on the at least one of the first and second threaded female housings is present on one portion of the sleeve, in an inside of a corresponding one of the first and second threaded female housings in the form of a first annular stopping surface oriented in such a manner that it opposes a forward movement of the corresponding one of each of the first and second male elements, the first male shoulder stop of the at least one of the first and second male elements defining a second annular stopping surface which cooperates with the first annular stopping surface of the corresponding one of the first and second threaded female housings in the screwed down position.

5. A threaded joint according to claim 1, wherein each of said first and second male elements comprises an annular surface which can serve as a shoulder stop and can be screwed into the female housings.

6. A threaded joint according to claim 3, wherein the annular stopping surface of each of said first and second female housings is on a plane substantially perpendicular to an axis of the sleeve, and located between the concave tapering surface and an end of a female thread of each of said first and second threaded female housings, said annular stopping surface being suitable to bear against the corresponding annular surface of each of the first and second male elements, the corresponding surface of each of the first and second male elements being made in a wall of each of said first and second male elements between the convex tapering surface and an end of a male thread of each of said first and second male elements.

7. A threaded joint according to claim 3, wherein the first and second female shoulder stops of each of the first and second threaded female housings are located between the concave tapering surfaces of the corresponding first and second threaded female housings and the median plane of symmetry of the sleeve, and the first and second male shoulder stops of each of the first and second male elements are located between the end face and the convex tapering surface of the corresponding first and second male elements.

8. A threaded joint according to claim 3, wherein each of said first and second threaded female housings and each of said first and second male elements includes a two level thread, the first and second female shoulder stops of each of the first and second threaded female housings being located between the two levels of the thread of each of the first and second threaded female housings, the first and second male shoulder stops of each of the first and second male elements being located between the two levels of the thread of each of said first and second male elements.

9. A threaded joint according to claim 3, wherein a spacing between the first and second female shoulder stops located on each of the first and second threaded female housings is determined in such a manner that in the screwed-down position, the end faces of each of the first and second male elements are tightly abutted one against the other, and a slight clearance remains between at least one of the first and second male shoulder stops of one of the first and second male elements and one of the first and second female shoulder stops of one of the first and second threaded female housings.

10. A threaded joint according to claim 1, wherein each convex tapering surface of said first and second male elements comprises a large diameter end, the convex tapering surface of each of said first and second male elements extending from the corresponding end face to an annular joining surface having a toric shape, said annular joining surface extending to a connecting surface which extends to the large diameter end.

11. A threaded joint according to claim 10, wherein the concave tapering surface on each of said first and second threaded female housings which cooperates with the convex tapering surface of each of said first and second male elements has a diameter which is greater than the large diameter end of the convex tapering surface of each of said first and second male elements, and a generating line of the concave tapering surface of each of the first and second threaded female housings is parallel to a generating line of the corresponding convex tapering surface of each of said first and second male elements.

12. A threaded joint according to claim 1, wherein a generating line of the convex tapering surface of each of said first and second male elements is between 0.5 and 5 mm long and is inclined between 5° and 25° with respect to the axis of each of the first and second male elements.

13. A threaded joint according to claim 1, wherein a small diameter end of the convex tapering surface of each of said first and second male elements is joined to the end face of the corresponding first and second male elements by a toric connecting surface with a radius of between 0.2 and 1.5 mm.

14. A threaded joint according to claim 1, wherein an annular zone is disposed inside of the sleeve and in the non-threaded abutment zone of each of the first and second threaded female housings, said annular zone being located adjacent to a beginning of a tapering thread of each of the first and second threaded female housings and being arranged to allow machining of the tapering thread.

15. A threaded joint according to claim 1, wherein the first metal-to-metal bearing contact surface of the end faces of the first and second male elements in the screwed down position is flat and perpendicular to an axis of the sleeve.

16. A threaded joint according to claim 1, wherein the first and second male elements and the first and second threaded female housings have threads which taper with a positive interference.

17. A threaded joint according to claim 1, wherein the first and second male elements and the first and second threaded female housings have threads which are cylindrical.

18. A threaded joint according to claim 1, wherein the first and second male elements and the first and second threaded female housings have two-level threads.

19. A threaded joint according to claim 1, wherein the first and second male elements and the first and second threaded female housings have threads of a buttress type with load flanks which have positive or negative angles.

20. A method for carrying out a joining between the sleeve and the first and second male elements according to claim 3, wherein the first male element is screwed into the first threaded female housing until an increase in a tightening torque is detected, combined with a blocking of an advancement due to a coming into contact of the first male shoulder stop of the first male element and the first female shoulder stop of the first threaded female housing, then the second male element is screwed into the second threaded female housing until the end faces of the first and second male elements abut and application of a desired tightening torque, a slight clearance remaining at an end of the screwing between the second male shoulder stop of the second male element and the second female shoulder stop of the second female housing.

21. A threaded joint according to claim 4, wherein the annular stopping surface is on a plane substantially perpendicular to an axis of the sleeve, and located between the concave tapering surface and an end of a female thread of the corresponding one of each of said first and second threaded female housings, said annular stopping surface being suitable to bear against the annular surface made in a wall of the corresponding one of said first and second male elements between the convex tapering surface and an end of a male thread of the corresponding one of said first and second male elements.

22. A threaded joint according to claim 4, wherein the first female shoulder stop of the at least one of the first and second treaded female housings is located between the concave tapering surface of the at least one of the first and second treaded female housings and the median symmetry of the sleeve, and the first male shoulder stop of the at least one of the first and second male elements is located between the end face and the convex tapering surface of the at least one of the first and second male elements.

23. A threaded joint according to claim 4, wherein each of said first and second threaded female housings and each of the first and second male elements includes a two level thread, the first female shoulder stop of the at least one of the first and second threaded female housings being located between the two levels of the thread of the at least one of the first and second threaded female housings, the first male shoulder stop of the at least one of the first and second male elements being located between the two levels of the thread of the at least one of the first and second male elements.

24. A threaded joint according to claim 1, wherein said non-threaded peripheral zone of the said first and second male elements extends from said end face.

* * * * *

UNITED STATES PATENT AND TRADEMARK OFFICE
CERTIFICATE OF CORRECTION

PATENT NO. : 5,769,466
DATED : June 23, 1998
INVENTOR(S) : Thierry NOEL ET AL.

It is certified that error appears in the above-identified patent and that said Letters Patent is hereby corrected as shown below:

Column 5, line 24, change "a a" to --a--;

Column 8, line 12, change "notenter" to --not enter--.

Column 9, line 41, after "can" insert --comprise--.

Column 14, line 22, after "median" insert --plane of--.

Signed and Sealed this

Twenty-second Day of June, 1999

*Attest:*

Q. TODD DICKINSON

*Attesting Officer*     *Acting Commissioner of Patents and Trademarks*

UNITED STATES PATENT AND TRADEMARK OFFICE
SUPPLEMENTAL CERTIFICATE OF CORRECTION

PATENT NO. : 5,769,466

DATED : June 23, 1998

INVENTOR(S): Thierry NOEL, et al.

It is certified that an error appears in the above-identified patent and that said Letters Patent is hereby corrected as shown below:

Column 5, line 60, delete in its entirety and substitute --The arc angle of this generating line, where there is a connection with a cylindrical surface, equals the inclination of the convex tapering surface.--;

line 61, delete "surface."

Signed and Sealed this

Sixteenth Day of November, 1999

Attest:

Q. TODD DICKINSON

Attesting Officer

Acting Commissioner of Patents and Trademarks